Figure 1:
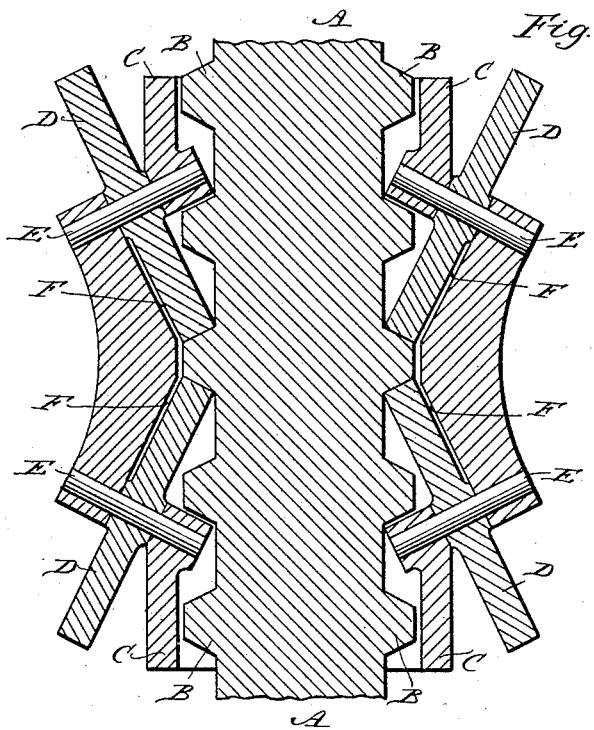

(No Model.) 2 Sheets—Sheet 1.

C. A. LIEB.
ANTI-FRICTION GEARING FOR THREADED RODS.

No. 431,067. Patented July 1, 1890.

WITNESSES:
D. C. Reusch.
Jolis Ritterband

INVENTOR
Charles A. Lieb
BY Phillips Abbott ATT'Y.

(No Model.) 2 Sheets—Sheet 2.

C. A. LIEB.
ANTI-FRICTION GEARING FOR THREADED RODS.

No. 431,067. Patented July 1, 1890.

WITNESSES:

INVENTOR
Charles A. Lieb
BY Phillips Abbott
his ATTORNEY

UNITED STATES PATENT OFFICE.

CHARLES A. LIEB, OF NEW YORK, N. Y.

ANTI-FRICTION GEARING FOR THREADED RODS.

SPECIFICATION forming part of Letters Patent No. 431,067, dated July 1, 1890.

Application filed February 20, 1890. Serial No. 341,210. (No model.)

*To all whom it may concern:*

Be it known that I, CHARLES A. LIEB, a citizen of the United States, and a resident of New York city, in the county of New York and State of New York, have invented certain new and useful Improvements in Anti-Friction Gearing for Threaded Rods, &c., of which the following is a specification.

My invention relates to an improvement in anti-friction gearing for threaded rods or shafts; and it consists, broadly stated, in applying to the sleeve anti-friction rollers or wheels so disposed that they bear upon the thread of the rod or shaft and take the strain upon their rolling-surfaces, which is transmitted to the sleeve through their axes. And the invention also extends to a peculiar arrangement of the rollers or wheels in pairs, so combined with an interposed roller or wheel as that the thrust of the thread in one direction, which is taken from one side of the thread, is transmitted through the intermediate roller to the other roller of the pair, and thence to the opposite side of the thread at another part of the rod or shaft. Thus strain is taken off from the axes of the rollers, and the operation of the apparatus is made more smooth and equal.

My invention is also applicable to worm-gear mechanism, it being somewhat modified to adapt it to the changed relation of the parts.

In the drawings the same reference-letters indicate the same parts in all the figures.

Figure 2:
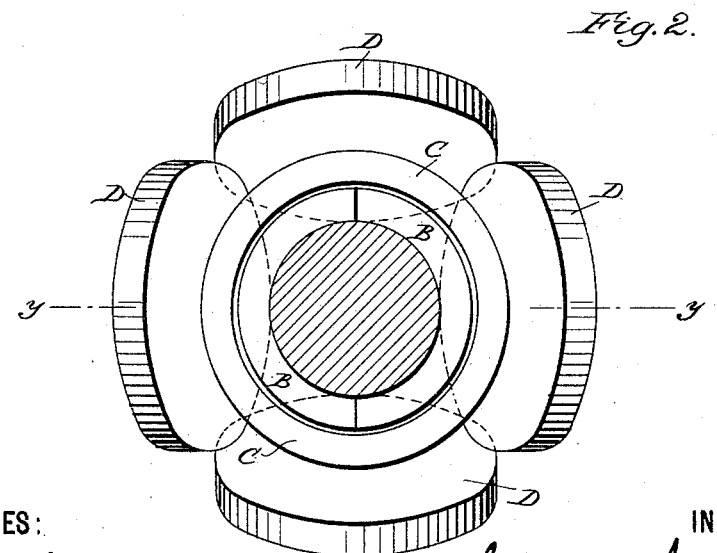
Figure 3:
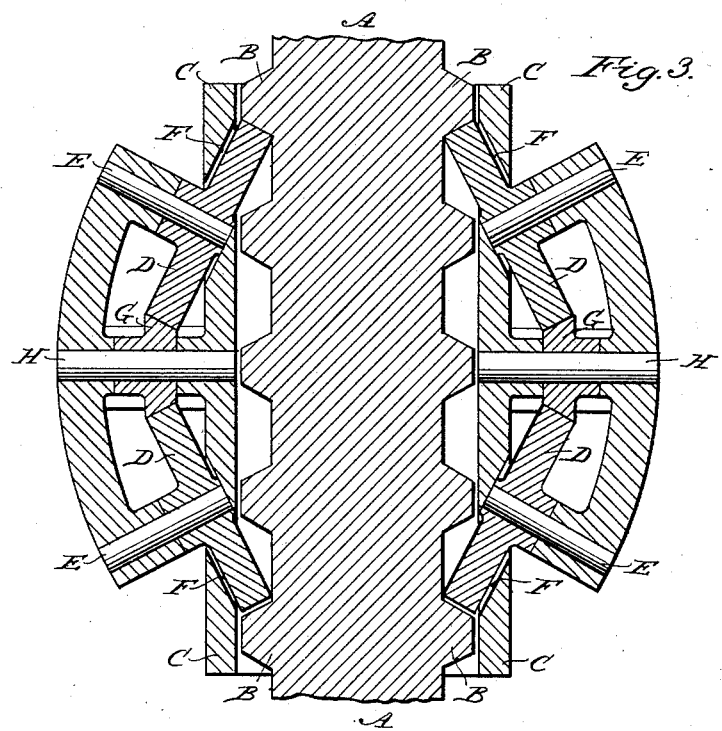
Figure 4:
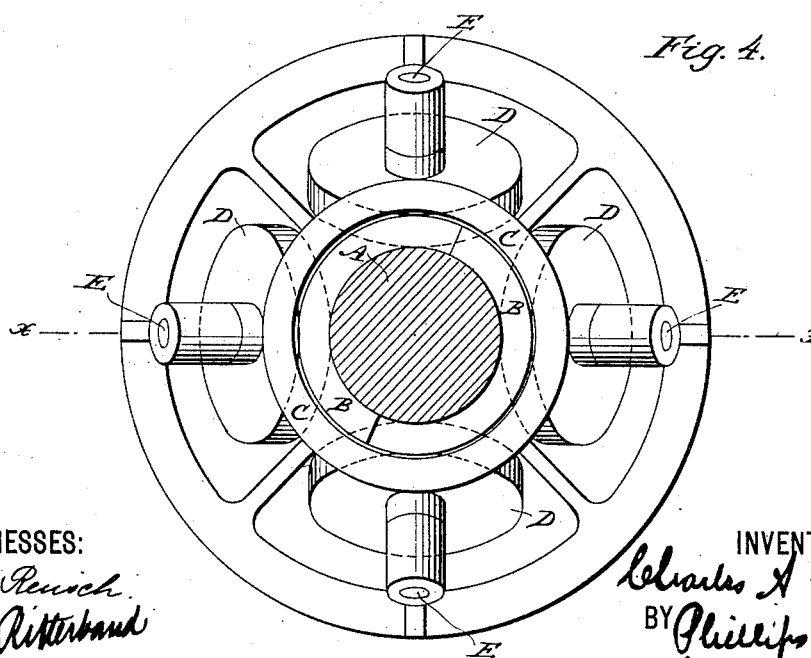

Figure 1 illustrates a longitudinal section of a threaded rod, showing one form of sleeve and rollers applied thereto, taken on the line *y y* of Fig. 2. Fig. 2 illustrates an end view of the parts shown in Fig. 1, as viewed from the right. Fig. 3 illustrates a longitudinal section of an alternative form of rod and sleeve with rollers on the line *x x* of Fig. 4. Fig. 4 illustrates an end view of the parts shown in Fig. 3.

A is the threaded rod or shaft. B are the threads thereon.

C is the sleeve, and D are the anti-friction rollers supported on axes E. There are at least three rollers in the circumference of the sleeve which have the same presentation relative to the thread on the rod. There may be two only; but the apparatus will be more practical if there be at least three. There may be as many more as there is space for in the circumference of the sleeve.

In Figs. 1 and 2 I show a construction in which the anti-friction rollers are all inclined inwardly through suitable slots F, made in the sleeve, all those that are inclined in one direction impinging upon one side of the thread, and all those inclined in the other upon the opposite side of the thread. Thus when the rod or shaft is turned in one direction the wheels which engage with the working side of the thread do all the work and do not receive any assistance from the others, and vice versa.

In Figs. 3 and 4 I show a modified construction, in which it will be seen that the rollers are arranged in pairs, and are inclined in the reverse direction from those above described, and that instead of taking their bearing against the thread or threads of the rod or shaft which are near the center of the sleeve they bear upon those which are adjacent to the ends of the sleeve, and that there is a roller G set upon a shaft H, which is supported in the sleeve placed between the anti-friction rollers proper of each pair, the face of the intermediate roller being cut at such an angle as to coincide with and squarely rest against the faces of each of the anti-friction rollers proper. This form of my invention I prefer for many uses, because the sleeve is thereby supported at its ends and by threads which are near the ends of the sleeve, instead of those near the middle thereof. Thus rocking of the sleeve is prevented, and also because the interposed roller G takes the thrust of the working anti-friction roller and transmits it to the other anti-friction roller, which in turn gets support from the idle or non-working side of the thread. Thus almost all strain is removed from the shafts of the rollers.

It will be noticed that the slots in the sleeve through which the anti-friction rollers work are so located as to conform to the pitch of the thread or threads on the rod or shaft. In other words, each is somewhat in advance of its immediate follower.

It is evident that the power may be applied to either the rod or to the sleeve.

I do not limit myself to the details of construction shown and described, since it will be obvious to those who are skilled in the art that modifications may be made therein and still my invention be employed.

I claim—

1. An anti-friction gearing comprising, essentially, a threaded rod or shaft and a sleeve having two sets of rotatable rollers supported thereon, one set adapted to bear on one side of the thread of the rod or shaft and the other set on the opposite side of the thread, substantially as set forth.

2. An anti-friction gearing comprising, essentially, a threaded rod or shaft and a sleeve having two sets of rotatable rollers supported thereon, one set adapted to bear on one side of the thread of the rod or shaft and the other set on the opposite side of the thread, and a roller interposed between the rollers of the said sets, whereby the thrust on one set of rollers is transmitted to the other set, substantially as and for the purposes stated.

Signed at New York, in the county of New York and State of New York, this 11th day of February, A. D. 1890.

CHARLES A. LIEB.

Witnesses:
PHILLIPS ABBOTT,
FREDERICK SMITH.